2,809,372
Patented Oct. 8, 1957

2,809,372

HYDROGEN HALIDE DERIVATIVES OF ISO-OLEFIN-POLYOLEFIN POLYMERS MIXED WITH RUBBERY POLYMERS CONTAINING A MAJOR PROPORTION OF DIOLEFIN

Marvin R. Frederick, Wadsworth, and Richard T. Morrissey, Cuyahoga Falls, Ohio, assignors to The B. F. Goodrich Company, New York, N. Y., a corporation of New York No Drawing. Application January 13, 1953, Serial No. 331,112

5 Claims. (Cl. 260—5)

This invention relates to novel materials of the class characterized as being hydrogen halide derivatives of isoolefin-polyolefin interpolymers, and it relates particularly to rubbery materials of this class; to the preparation thereof; and to compositions comprising these materials together with other materials, particularly other rubbery materials such as natural rubber and synthetic rubbers.

Synthetic rubbers containing a major proportion of an olefin such as isbutylene and a minor proportion of one or more polyolefinic hydrocarbons such as the conjugated dienes represented by isoprene are well known. Such interpolymers are characterized by having a high molecular weight, a low degree of unsaturation and slow reactivity with curing or vulcanizing agents such as sulfur to obtain elastic products. The presently best known examples of such interpolymers are the co-polymers of isobutylene with a small proportion of isoprene, known to the rubber industry as Butyl or GR–I rubber.

Butyl rubber has been used widely in the manufacture of inner tubes, but certain inherent disadvantages of the polymer have prevented more widespread use. For example, Butyl rubber cures more slowly with sulfur than other useful sulfur vulcanizable rubbers; it does not adhere well to other materials such as natural rubber; when it is mixed with natural rubber and the mixture is vulcanized the resulting vulcanizates are generally less useful and valuable than vulcanizates from either of these rubbery materials alone. Among the ways to overcome the disadvantages of Butyl rubbers is to brominate the polymer as disclosed in a copending application of Richard A. Crawford and Richard T. Morrissey, Serial No. 156,724, filed April 18, 1950, now Patent 2,631,984; to chlorinate the polymer as is disclosed in a copending application of Richard T. Morrissey and Marvin R. Frederick, Serial No. 324,412, filed December 5, 1952; or to add iodine monochloride to the polymer as is disclosed in a copending application of Richard T. Morrissey, Serial No. 339,933, filed March 2, 1953.

We have now found that the introduction of small and critical amounts of fluorine, chlorine or bromine atoms into the polymer structure of Butyl rubber and similar isoolefin-polyolefin interpolymers by reaction of such a polymer with a hydrogen halide, so as to produce a controlled number of units of the structure

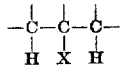

wherein X is fluorine, chlorine or bromine, results in new materials with properties unexpectedly superior to those of the halogen-free polymers. Thus, we have found that hydrohalogenated rubbery isoolefin-polyolefin interpolymers prepared in this way to contain fluorine, chlorine or bromine in essentially the structure defined above in amounts from 0.1 weight percent to an amount equivalent to about 1.0 weight percent of fluorine may be cured or vulcanized quite rapidly, even with vulcanizing agents which are ineffective with the non-hydrohalogenated materials, to yield vulcanized products which far surpass those obtained from the non-hydrohalogenated materials in a number of respects including better aging properties, and which are fully equal or superior to the vulcanizates from the non-hydrohalogenated materials in other respects such as tensile strength and elasticity, low temperature flexibility and resistance to air-diffusion. In addition, such hydrohalogenated interpolymers, unlike the non-hydrohalogenated materials, adhere well to a variety of materials including natural and synthetic rubbers and are therefore of great value as adhesives.

We have also found that such halogen-containing interpolymers may be mixed with natural rubber or any of the various known synthetic rubbers in any desired proportions and that the resulting mixtures may be co-vulcanized to obtain products of excellent properties. Mixtures of Butyl rubber with small amounts of natural rubber cannot be vulcanized to a state of appreciable strength, but similar mixtures of natural rubber and hydrohalogenated interpolymers of the type described can be vulcanized to obtain products having good tensile strength and other excellent properties. Similarly, small amounts of such hydrohalogenated interpolymers remarkably improve other properties of natural vulcanizates when mixed with them, whereas non-hydrohalogenated interpolymers so used in natural rubber act only as inert fillers with no significant improvement in properties of the original rubber.

It is quite surprising that useful fluorine-containing isoolefin-polyolefin interpolymers are obtained by means of this invention. Ordinarily when an attempt is made to saturate part of the olefinic double bonds in such interpolymers with elemental fluorine, the polymer is so degraded as to be useless, but when the critical amounts of hydrogen fluoride defined herein are added to an isoolefin-polyolefin interpolymer, useful rubbery products are obtained. It is also surprising and quite unexpected that polymers containing as low as 0.1 weight percent of halogen are useful and improved over the non-hydrohalogenated interpolymers, it having been generally believed that much higher concentrations of halogen were required to obtain useful products different in nature from the non-hydrohalogenated interpolymers.

The halogen-containing isoolefin-polyolefin interpolymers of this invention are prepared, according to our procedure, by reacting an isoolefin-polyolefin hydrocarbon interpolymer with hydrogen fluoride, hydrogen chloride or hydrogen bromide at a temperature of preferably less than about 25° C. to obtain a polymer containing the specified amounts of combined halogen. Since the reaction which occurs involves an addition of hydrogen halide to olefinic double bonds, the isoolefin-polyolefin interpolymer used must and will, of course, contain olefinic unsaturation, but its nature may be otherwise varied quite widely.

Preferred isoolefin-polyolefin interpolymers for use in preparing the hydrohalogenated derivatives are the solid, plastic, rubbery, interpolymers containing a major proportion, desirably from 70 to 99 weight percent, of an isoolefin generally containing from 4 to 8 carbon atoms such as, most desirably, isobutylene or, alternatively, 3-methyl butene-1, 4-methyl pentene-1, 2-ethyl butene-1, 4-ethyl pentene-1 or the like or a mixture of such isoolefins, with a minor proportion desirably from 1 to 30 weight percent of a polyolefinic hydrocarbon generally containing from 4 to 18 carbon atoms, or two, three or more such hydrocarbons, including the following:

(1) Preferably acyclic or open-chain conjugated diolefins such as butadiene-1,3, isoprene, 2,4-dimethyl butadiene-1,3, piperylene, 3-methyl pentadiene-1,3, hexadiene-2,4, 2-neopentyl butadiene-1,3, and the like;

(2) Acyclic non-conjugated diolefins such as dimethallyl and its homologs containing 2 to 6 carbon atoms interposed between the two isopropenyl radicals, 2-methyl hexadiene-1,5, 2-methyl pentadiene-1,4, 2-methyl heptadiene-1,6, 2-methyl heptadiene-1,4 and other tertiary non-conjugated diolefins having one double bond in the terminal position attached to a tertiary carbon atom;

(3) Alicyclic diolefins, both conjugated and non-conjugated such as cyclopentadiene, cyclohexadiene, 1-vinyl cyclohexene-3, 1-vinyl cyclohexene-1, 1-vinyl cyclopentene-1, 1-vinyl cyclobutene-2, dicyclopentadiene and the like as well as monocyclic diolefinic terpenes such as dipentene, terpinenes, terpinolene, phellandrenes, sylvestrene and the like;

(4) Acyclic triolefins such as 2,6-dimethyl-4-methylene-heptadiene-2,5, 2-methyl hexatriene-1,3,5 and other conjugated triolefins, as well as myrcene, ocimene, alloocimene and the like;

(5) Alicyclic triolefins such as fulvene, 6,6-dimethyl fulvene, 6,6-methyl ethyl fulvene, 6-ethyl fulvene, 6,6-diphenyl fulvene, 6-phenyl fulvene and other fulvenes of the formula

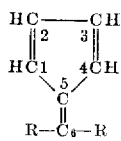

wherein each R is hydrogen, alkyl, cycloalkyl or aryl; as well as other alicyclic triolefins such as 1,3,3-trimethyl-6-vinyl cyclohexadiene-2,4, cycloheptatriene etc.;

(6) Higher polyolefins such as 6,6-vinyl methyl fulvene (a tetraolefin) and 6,6-diisopropenyl fulvene (a pentaolefin); and, (7) Polyolefinic hydrocarbons containing aromatic nuclei such as the phenyl butadienes, divinyl benzenes, diallyl benzenes, vinyl allyl benzene and divinyl naphthalenes.

The preferred solid, plastic, rubbery interpolymers for use in preparing the hydrogen halide derivatives are generally themselves prepared by a low temperature (temperatures range from 0° C. to as low as −165° C. but are generally about −100° C.) interpolymerization reaction utilizing an appropriate catalyst, generally an active metal halide or Friedel-Crafts type catalyst such as aluminum chloride or boron trifluoride, dissolved in a solvent with a low freezing point such as methyl or ethyl chloride, and when so prepared, generally possess an average molecular weight above 15,000 and usually as high as 300,000 or higher, iodine numbers in the range of 0.5 to 50 and are reactive with sulfur to yield elastic products on suitable heating. Of the preferred interpolymers, we find it most desirable in preparing the hydrohalogenated derivatives of this invention to utilize the solid plastic interpolymers of isobutylene with small amounts of isoprene or butadiene, of the character of Butyl rubbers which contain about 90 to 99 weight percent of isobutylene and 1 to 10 weight percent of aliphatic conjugated diolefin, and preferably containing less than 5 weight percent of aliphatic conjugated diolefin.

It is to be understood that in addition to the preferred materials set forth above, any of the other known isoolefin-polyolefin interpolymers may also be utilized to prepare hydrohalogenated derivatives having desirable properties not possessed by the non-hydrohalogenated interpolymers. For example, plastic interpolymers of low molecular weight and/or not readily vulcanizable with sulfur, yield in accordance with this invention, hydrohalogenated derivatives which possess enhanced adhesive properties entirely unexpected from the low concentration of bound halogen employed, and the ability to be used advantageously in compounding rubbery materials.

Similarly, isoolefin-polyolefin interpolymers containing other interpolymerized monomers such as styrene, chlorostyrene, acrylyl chloride, methallyl chloride and other monoolefinic monomers are also advantageously used to prepare similar hydrohalogenated interpolymer derivatives.

The hydrohalogenation reaction may be carried out in any desired manner, preferably at a temperature below about 25° C., so long as the amount of halogen halide which is added to the polymer is controlled so as to obtain a polymer containing an amount of halogen within the limits and in the structure set forth hereinbefore. One method consists in preparing a solution, dispersion, or cement of the interpolymer in an appropriate normally liquid organic solvent or diluent such as a hydrocarbon or halogenated derivative thereof (examples of which are toluene, chlorobenzene, butane, hexane, heptane, ethyl chloride, trichloroethane, carbon tetrachloride etc.) and adding the hydrogen halide either as such or in solution to the interpolymer solution, dispersion or cement, thereby to form hydrohalogenated interpolymer in solution or dispersion in the solvent or diluent. The resulting solution or dispersion may be utilized as such, as, for example, when the hydrohalogenated derivative is employed as an adhesive, or it may be mixed with a non-solvent for the hydrohalogenated interpolymer derivative (such as alcohol or water) to precipitate the hydrohalogenated derivative which may then be recovered in solid, finely divided or crumb-like form. It should be noted that the solvent or diluent employed should be one that is liquid at the temperature of reaction. When drying the solid reaction product, care must be taken not to overheat the material since excessive heat degrades the halogenated interpolymer.

A variation of this method consists in utilizing as the solvent or diluent for the hydrohalogenation a saturated hydrocarbon or halogenated derivative thereof which boils below room temperature, as in the range −30 to 20° C. such as methyl or ethyl chloride or butane, and carrying out the hydrohalogenation at a temperature below 0° C. at a temperature and pressure such that the solvent or diluent is maintained in the liquid state. The use of these materials greatly simplifies recovery of the solvent or diluent since the resulting hydrohalogenated mass may be run into water which contains a colloidal protective agent and is above the boiling point of the solvent or diluent so that the latter is flashed off and condensed while the hydrohalogenated interpolymer is precipitated or coagulated in a conveniently handled crumb form. In addition, since solid, rubbery, isoolefin-polyolefin interpolymers are generally prepared by polymerization at low temperatures in such a solvent, use of this variation also permits efficient and practical integration of the processes of preparing and hydrohalogenating isoolefin-polyolefin interpolymers.

Another method of carrying out the hydrohalogenation consists of passing gaseous hydrogen chloride or hydrogen bromide over a solid isoolefin-polyolefin interpolymer in a finely divided form.

Regardless of the particular method employed for effecting the hydrohalogenation, it has been found that the reaction occurs quite readily and essentially involves the addition of the hydrogen halide to the olefinic double bonds of the interpolymer. Consequently, the resulting halogen-containing interpolymers possess in their structure units of the formula

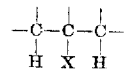

where X is fluorine, chlorine or bromine. Most of the halogen present in the hydrohalogenated polymer is in such a structural relation, and there may be one or more of fluorine, chlorine or bromine in the same polymer molecule as for example:

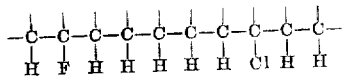

The amount of hydrogen halide which reacts with the interpolymer during the hydrohalogenation reaction depends of course on the amount of unsaturation as well as upon the method of hydrohalogenation, the concentration of the hydrohalogenating agent and the temperature of reaction. When all the other factors are equal, there appears to be an approximate straight line relation between the original concentration of hydrogen halide and the amount of halogen present in the hydrohalogenated interpolymer. This is quite advantageous in that the halogen content of the hydrohalogenated interpolymer can be controlled quite closely simply by regulating the concentration of the hydrogen halide and to some extent the time of reaction. Control of these variables is quite important since the amount of combined halogen in the interpolymer has been found to be critical to realize the advantages of this invention. Mixtures of hydrogen halides may be employed profitably.

The halogen-containing interpolymers resulting from the hydrohalogenating reaction may contain as little as 0.10 weight percent of at least one halogen selected from the class consisting of fluorine, chlorine and bromine or as much as 1.0 weight percent equivalent of fluorine, that is, about 2.0 weight percent of chlorine or about 4.0 weight percent of bromine. Preferably the upper limit is equivalent to 0.5 weight percent of fluorine which is equivalent to about 1.0 percent of chlorine or about 2 percent of bromine. This invention contemplates and includes within its scope hydrohalogenated interpolymers containing one or more of the listed halogens within the equivalency ranges set forth above, for example, a hydrohalogenated interpolymer containing 0.25 weight percent of fluorine and 0.5 weight percent of chlorine; or 0.05 weight percent of fluorine and 0.2 weight percent of bromine; or 0.5 weight percent chlorine and 0.5 weight percent bromine or equivalent amounts of all three. When halogen concentrations higher than those equivalent to about 1.0 weight percent fluorine are employed, the interpolymer loses some of its most desirable properties as a result of polymer degradation. Preferably the percentage of combined halogen is less than that which would be theoretically present if all of the olefinic double bonds in the interpolymer were completely hydrohalogenated and in interpolymers of low initial unsaturation it is preferred to retain at least about 10 percent of the original unsaturation. The molecular weight of the hydrohalogenated interpolymer of this halogen content prepared in the manner indicated, is of about the same order as that of the parent non-hydrohalogenated interpolymer.

It has been found that the temperature at which the reaction is conducted is somewhat critical if the optimum physical properties of the hydrohalogenated interpolymer are to be realized. The reaction should be conducted under conditions such that the hydrohalogenation takes place at a temperature below about 25° C. and preferably at or below 0° C., although higher temperatures such as 40° C. may be employed to obtain useful, but not superior, products. If the reaction is allowed to take place at temperatures above about 25° C., the interpolymer may be degraded so that it no longer retains all of the original properties of the interpolymer and some of the advantages sought through the use of the halogen may be lost. Temperatures in the range of 25° C. to −30° C. are most useful and practical and temperatures between 0° C. and −30° C. are preferred, although much lower temperatures such as −100° C. may be employed or even lower temperatures, as −165° C. It is understood that at the lower temperatures the hydrohalogenation reaction is slower.

As mentioned hereinbefore, the properties of the halogen-containing interpolymers of this invention are quite unique. The hydrohalogenated derivatives of solid, plastic, rubbery interpolymers are themselves solid, plastic, rubbery materials which possess the advantages of the parent non-hydrohalogenated materials and in addition are far superior with respect to adhesive properties, ease of vulcanization and various other properties of the vulcanizates. They may be used for all of the purposes for which the non-hydrohalogenated interpolymers are useful, as for example, the manufacture of inner tubes, tire curing bags etc., and they may be used for various purposes of particular importance in the manufacture of tires and a multitude of other rubber products in which the non-hydrohalogenated materials are unsatisfactory. For example, they may be used as adhesives to bond rubbery materials to each other, being especially useful in bonding non-hydrohalogenated isoolefin-polyolefin interpolymers to each other, to natural rubber and to diene synthetic rubbers. They may also be used quite advantageously in vulcanizable admixtures in any desired proportions with natural rubber and diene synthetic rubbers, imparting many desirable properties including increased resistance to aging and air-diffusion to the resulting vulcanizates. In any of these applications they may be compounded with the conventional ingredients used in the compounding of non-hydrohalogenated, rubber, isoolefin-polyolefin interpolymers or other rubbery materials, and they may be vulcanized by the same general methods. Their vulcanization proceeds more rapidly than that of nonhydrohalogenated materials despite their generally lower degree of unsaturation, and they may be vulcanized with agents other than sulfur such as bivalent metal oxides, particularly zinc oxide in the presence of carbon black.

The preparation, properties, compounding, vulcanization and use of the hydrohalogenated interpolymers of this invention are more fully set forth in the following examples which are intended as illustrative only since numerous modifications and variations therein will be apparent to those skilled in the art. In the examples, all parts, unless otherwise specified, are parts by weight.

*Examples 1 to 5*

In these examples the hydrogen halide is added to a solution of 100 grams of an interpolymer of 97 percent isobutylene and 3 percent isoprene dissolved in 1000 grams of butane. The apparatus employed for the hydrohalogenation is a two liter stainless steel pressure autoclave fitted with an inlet tube, a stainless steel needle reaching to the bottom of the autoclave for adding the hydrogen halide, a safety pressure disc, an outlet tube equipped with a valve for releasing pressure, and a ¼ inch discharge outlet at the bottom of the autoclave fitted with a globe valve. Hydrogen chloride and hydrogen bromide are charged through a 50 ml. syringe from a source of gaseous hydrogen halide, preferably from a weighed cylinder. The hydrogen fluoride is charged from a brass pipe fitted with valves and a hypodermic fitting and is weighed and charged in the liquid state. The hydrogen halide is added to a solution of the interpolymer in solvent during the specified time period and after an additional time period, usually 5 minutes after all of the hydrogen halide is in, the product is neutralized with an equivalent amount of potassium hydroxide dissolved in ethanol. A stabilizer which is an epoxidized diester of cotton seed fatty acid is added to the cement and the cement is dumped into hot water (60 to 70° C.) containing about two grams of zinc stearate per 100 grams of polymer and which is being stirred at a rapid rate. The precipitated polymer is filtered on cheese cloth, washed with hot water and dried in a vacuum oven at 55 to 60° C.

POLYMER PREPARATION

| Example Number | Hydrogen Halide, Grams | Reaction Time, Minutes | Temperature, °C. | Halogen in Polymer, Weight Percent |
|---|---|---|---|---|
| 1 | HF, 2.0 | 10 | −20 | 0.47 F. |
| 2 | HF, 2.0 | 10 | −40 | 0.46 F. |
| 3 | HF, 3.0 | 60 | −40 | 0.30 F. |
| 4 | HCl, 1.5 | 50 | −20 | 0.12 Cl. |
| 5 | HBr, 3.6 | 40 | −20 | 0.11 Br. |

The hydrohalogenated interpolymers of Examples 1 through 5 are all solid, plastic, rubbery products. When these materials are placed on a rubber mill, they quickly form a smooth sheet and when pigments are added to the stock they are taken up quickly. When these interpolymers are compounded to the following recipe, there is obtained a compounded stock which cures rapidly under the influence of heat and pressure to form vulcanizates of good physical properties.

Compounding recipe: Parts by weight
  Halogenated interpolymer _____ 100.0
  Easy processing carbon black _____ 50.0
  Zinc oxide _____ 5.0
  Stearic acid _____ 3.0
  Mercaptobenzothiazole _____ 0.5
  Tetramethyl-thiuram disulfide _____ 1.5
  Sulfur _____ 2.0

When the hydrohalogenated interpolymers of Examples 1 through 5 are compounded to the above recipe and cured at 307° F., the following stress-strain results are obtained on the vulcanizates:

| Example Number | Optimum Cure, Minutes | 300% Modulus, p. s. i. | Tensile Strength, p. s. i. | Elongation, Percent |
|---|---|---|---|---|
| 1 | 30 | 275 | 3,000 | 850 |
| 2 | 30 | 700 | 2,650 | 675 |
| 3 | 30 | 550 | 2,925 | 775 |
| 4 | 30 | 400 | 2,650 | 735 |
| 5 | 30 | 500 | 2,650 | 725 |

The vulcanizates of the hydrohalogenated interpolymer exhibit physical properties equivalent to or better than those exhibited by an equivalent non-hydrohalogenated isobutylene-isoprene copolymer.

Examples 6 to 10

The hydrohalogenated interpolymers of Examples 1 through 5 are mixed with natural rubber in a ratio of 70 weight parts of hydrohalogenated interpolymer and 30 weight parts of natural rubber and these mixtures compounded to the recipe given below and the compounded stock cured at a temperature of 307° F.

Compounding recipe: Parts by weight
  Rubber mixture _____ 100.0
  Mono and diheptyl diphenylamines _____ 1.0
  Furnace black _____ 35.0
  Zinc oxide _____ 5.0
  Stearic acid _____ 1.5
  Mercaptobenzothiazole _____ 0.75
  Di-ortho-tolyl guanidine _____ 0.5
  Sulfur _____ 2.25

The following stress-strain results are obtained on these vulcanizates:

| Example Number | Optimum Cure, Minutes | 300% Modulus, p. s. i. | Tensile Strength, p. s. i. | Elongation, Percent |
|---|---|---|---|---|
| 6 | 30 | 975 | 1,075 | 335 |
| 7 | 30 | 1,025 | 1,500 | 500 |
| 8 | 20 | 875 | 1,100 | 400 |
| 9 | 45 | 1,000 | 1,100 | 335 |
| 10 | 20 | — | 975 | 1,275 | 450 |

The above results are particularly outstanding, first in curing at all and second in the physical properties obtained. When an equivalent isobutylene-isoprene copolymer is mixed with natural rubber in the above ratio and recipe and cured, the mixture for all practical purposes does not cure at all and even after long periods of time the physical properties of the stock are very poor, having tensile strengths of only a few hundred pounds as contrasted with the snappy cured stocks obtained as shown above.

The natural rubber used in the Examples 6 through 10 above may be replaced by diene synthetic rubbers including polychloroprene, polybutadiene and the like as well as copolymers of chloroprene, isoprene or butadiene with each other or with monoolefinic monomers such as styrene, acrylonitrile, acrylic and methacrylic acids and their alkyl esters, vinyl pyridine, vinylidene chloride and the like with generally equivalent results. This invention includes compositions comprising a hydrohalogenated isoolefin-polyolefin interpolymer of the type described in admixture in any desired proportion with any other unsaturated vulcanizable rubbery material. Such mixtures may be made by any of those methods known to those skilled in the art such as by mixers; blending dispersions, latices, solutions and the like.

Examples 11 to 15

The hydrohalogenated interpolymers of this invention are particularly useful as adhesives for adhering Butyl type rubbers to natural rubber. To illustrate this property, a non-hydrohalogenated vulcanizable Butyl rubber composition and a vulcanizable natural rubber composition are sheeted separately on a rubber mill and coated with a 10% n-heptane cement of the hydrohalogenated isoolefin-polyolefin of Example 1, which polymer contains 40 to 50 parts of easy processing channel black after which the cemented surfaces are pressed together and the assembly vulcanized. This is repeated with the products of Examples 2, 3, 4 and 5. These assemblies are then tested in a Cooey Autographic Adhesion Tester and the adhesion is expressed in pounds of pullper inch of width between the two compositions required to separate them. The results obtained are:

ADHESION-BUTYL TO NATURAL RUBBER

Example: Pounds pull/inch width
  11 _____ 2.5
  12 _____ 2.2
  13 _____ 2.6
  14 _____ 4.0
  15 _____ 4.6

When a similar assembly is made without the hydrohalogenated interpolymer cement layer or a non-hydrohalogenated isoolefin-polyolefin interpolymer is employed, results of about 0.5 pound pull per inch of width are obtained.

When Examples 1 through 5 are repeated with other interpolymers as copolymers of 96 parts of isobutylene and 4 parts of 1-vinylcyclohexene-3, and 95 isobutylene and 5 parts of butadiene-1,3 and the like and when other hydrohalogenated interpolymers prepared at other preferred temperatures are employed, excellent similar results are obtained. Also quite surprising is the ability of these interpolymers to be cured with a bivalent metal oxide such as zinc oxide in amounts as low as 5 parts or lower without added sulfur or similar agents ordinarily required for the vulcanization of Butyl type rubbers. This is of utmost importance since such metal oxides alone will not cure to any degree the non-hydrohalogenated Butyl type rubbers. To obtain optimum cures with a bivalent metal oxide, the use of a carbon black in the compound is particularly advantageous. Amounts from 1 to 100 parts are usually employed with amounts from 15 to 75 parts by weight preferred.

From the foregoing description of the invention, it is apparent that hydrohalogenated isoolefin-polyolefin interpolymers of the type described constitute a new and widely useful class of materials. It is further apparent that various embodiments of the invention, in addition to those specifically disclosed may be provided without departing from the spirit and scope of the invention as defined in the appended claims.

We claim:

1. A vulcanizable composition of matter comprising a rubber selected from the class consisting of natural rubber and synthetic rubbers of a major proportion of a conjugated diolefin, and a solid, rubber, partially hydrohalogenated interpolymer of 90 to 99 weight percent isobutylene and 1 to 10 weight percent of an aliphatic conjugated diolefin formed by reacting in the presence of an organic liquid at a temperature below about 25° C. (1) a solid plastic rubbery interpolymer of 90 to 99 weight percent isobutylene and 1 to 10 weight percent of an aliphatic conjugated diolefin, with (2) a sufficient amount of a hydrogen halide selected from the group consisting of hydrogen fluoride, hydrogen chloride and hydrogen bromide to add to the interpolymer a total halogen content of from 0.1 weight percent at least one halogen selected from the class consisting of fluorine, chlorine and bromine to 1.0 weight percent equivalent of fluorine in essentially the structure

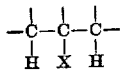

where X represents such a halogen atom, while retaining at least 10% of the original olefinic unsaturation of the parent interpolymer.

2. A vulcanizable composition of matter comprising a synthetic rubber of a major proportion of butadiene and a solid, rubbery, partially hydrohalogenated interpolymer of about 95 to 99 weight percent isobutylene and about 1 to less than 5 weight percent isoprene, formed by reacting in an organic liquid at a temperature below about 0° C. (1) a solid plastic rubber interpolymer of about 95 to 99 weight percent isobutylene and about 1 to less than 5 weight percent isoprene with (2) a sufficient amount of a hydrogen halide selected from the group consisting of hydrogen chloride, hydrogen fluoride and hydrogen bromide to add to (1) a total halogen content of from 0.1 weight percent of at least one halogen selected from the class consisting of fluorine, chlorine and bromine to 0.5 weight percent equivalent of fluorine in essentially the structure

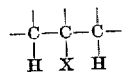

where X represents such a halogen atom, while retaining at least 10% of the original olefinic unsaturation of the parent interpolymer.

3. A vulcanizable composition of matter comprising natural rubber and a solid, rubbery, partially hydrohalogenated interpolymer of about 95 to 99 weight percent isobutylene and about 1 to less than 5 weight percent isoprene, formed by reacting in an organic liquid at a temperature below about 0° C. (1) a solid plastic rubbery interpolymer of about 95 to 99 weight percent isobutylene and about 1 to less than 5 weight percent isoprene with (2) a sufficient amount of a hydrogen halide selected from the group consisting of hydrogen chloride, hydrogen fluoride and hydrogen bromide to add to (1) a total halogen content of from 0.1 weight percent of at least one halogen selected from the class consisting of fluorine, chlorine and bromine to 0.5 weight percent equivalent of fluorine in essentially the structure

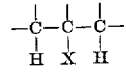

where X represents such a halogen atom, while retaining at least 10% of the original olefinic unsaturation of the parent interpolymer.

4. The vulcanizable composition of claim 2 wherein the synthetic rubber contains a major proportion of butadiene and a minor proportion of styrene, the interpolymer (1) is of a monomeric mixture of about 97 weight percent isobutylene and about 3 weight percent isoprene, the hydrohalogenating agent is hydrogen chloride, X is chlorine and the reaction is conducted in a temperature between about 0° and −30° C.

5. The vulcanizable composition of matter of claim 3 wherein (1) is of a monomeric mixture of about 97 weight percent isobutylene, 3 weight percent isoprene, the hydrohalogenating agent is hydrogen chloride, X is chlorine and the reaction is conducted at a temperature between about 0° and −30° C.

References Cited in the file of this patent

UNITED STATES PATENTS

| | | |
|---|---|---|
| 1,980,396 | Gebauer-Fuelnegg et al. | Nov. 13, 1934 |
| 2,596,878 | Van Veersen | May 13, 1952 |
| 2,631,984 | Crawford et al. | Mar. 17, 1953 |

U. S. DEPARTMENT OF COMMERCE
PATENT OFFICE

CERTIFICATE OF CORRECTION

Patent No. 2,809,372                                                      October 8, 1957

Marvin R. Frederick et al.

It is hereby certified that error appears in the printed specification of the above numbered patent requiring correction and that the said Letters Patent should read as corrected below.

Column 8, line 41, for "pullper" read -- pull per --; column 9, line 12, for "rubber" read -- rubbery --.

Signed and sealed this 15th day of April 1958.

(SEAL)
Attest:

KARL H. AXLINE
Attesting Officer

ROBERT C. WATSON
Commissioner of Patents